United States Patent [19]

Vavra et al.

[11] Patent Number: 4,686,856
[45] Date of Patent: Aug. 18, 1987

[54] MASS FLOW METER

[76] Inventors: Randall J. Vavra, 3131 Arlington Ave., Riverside, Calif. 92506; Michael J. Doyle, 2705 Calle Lona, Riverside, Calif. 92503

[21] Appl. No.: 851,262

[22] Filed: Apr. 9, 1986

Related U.S. Application Data

[63] Continuation of Ser. No. 470,097, Feb. 28, 1983, abandoned.

[51] Int. Cl.⁴ ............................................. G01F 1/68
[52] U.S. Cl. ..................................................... 73/204
[58] Field of Search ........................................... 73/204

[56] References Cited

U.S. PATENT DOCUMENTS

| | | | |
|---|---|---|---|
| 2,594,618 | 4/1952 | Booth, Jr. | 73/204 |
| 2,813,237 | 11/1957 | Fluegel | 73/204 |
| 2,896,452 | 7/1959 | Cogniat et al. | 73/204 |
| 3,085,431 | 4/1963 | Yerman et al. | 73/204 |
| 3,363,462 | 1/1968 | Sabin | 73/204 |
| 4,107,991 | 8/1978 | Benson | 73/204 |
| 4,440,021 | 4/1984 | Abouchar | 73/204 |

FOREIGN PATENT DOCUMENTS 1248563 10/1971 United Kingdom ................. 73/204

OTHER PUBLICATIONS

CGS/Datametric Bulletin 600 "Heated Sensor Finds Wide Application in Fluid Flow", 1970, pp. 4, 5 and FIGS. 1-3.
Jung, "IC OP AMP Cookbook" published by H. W. Sams 1980, pp. 133, 134.
Flow Corporation Bulletin 53, pp. 9 and 10, dated 5/66.

Primary Examiner—Herbert Goldstein
Attorney, Agent, or Firm—Fulwider, Patton, Rieber, Lee & Utecht

[57] ABSTRACT

A fluid mass flow meter that responds rapidly to changes in the rate of flow of a fluid and that is insensitive to variations in ambient temperature. The flow meter has a thermal clamp that clamps the sensor tube adjacent the extremities of a sensor disposed along the tube; a frequency compensating amplifier that, in cooperation with the thermal clamp, increases the frequency response of the meter; and an offset null bias circuit that, in combination with a bridge balancing potentiometer, corrects for the effects of variations in ambient temperature.

24 Claims, 15 Drawing Figures

MASS FLOW METER

This is a continuation of co-pending application Ser. No. 470,097 filed on Feb. 28, 1983, now abandoned.

BACKGROUND

1. Field of the Invention

This invention is directed to mass flow measuring systems, in general, and to a system wherein a vastly improved operation is achieved with a novel isothermal structural configuration together with a sensing circuit which is speeded up in a novel manner, in particular.

2. Prior Art

For years mass flow meters have been made using a thermal transfer principle, wherein a length of tubing has a pair of heater/sensor coils mounted thereon. Fluid enters the sensor tube at ambient temperature. The fluid conducts heat away from the first coil—(heater/sensor). The heated fluid then continues down the conduct to the second heater/sensor. An additional quantity of heat is again transferred to the fluid. The difference in temperatures of upstream and downstream sensors is an indication of mass flow rate. However, this method of sensing mass flow is relatively slow (a 10 second time constant is typical) and is dependent on the thermal response of the sensor tubing, gas conduction factor, temperature sensor thermal mass and thermal mass of the insulation surrounding the sensor. Electrical compensation has been tried in the sensor circuit but has only provided a small improvement because of the multiple time constants associated with the sensor.

In conventional mass flow measuring systems, a portion of the fluid being detected is passed through a sensing tube. An electrical coil (or dual coil) is wound on the tube. The coil forms a portion of a bridge network. As the resistance of the coil changes, the bridge network detects the flow characteristic. The resistance of the coil changes as a function of its temperature. The coil temperature is affected by the gas flow through the sensing tube. Typically, the bridge network is balanced without fluid flow through the tube and detection of fluid flow is a function of the bridge changes. Reference is herewith made to the copending application entitled IMPROVED MASS FLOW METER WITH REDUCED ATTITUDE SENSITIVITY by J. W. ABOUCHAR and M. J. DOYLE; Serial No. 173,282; filed on July 29, 1980; now U.S. Pat. No. 4,440,021, issued Apr. 3, 1984, to Abouchar et al. The cited co-pending patent application provides a suitable, detailed description of conventional mass flow measuring systems.

In particular, the referenced patent application describes a dual coil arrangement which is used in measuring the mass flow of a fluid over a wide temperature range with reduced attitude sensitivity. The referenced application specifies the use of an insulating material made of a fibrous material which encases the sensor elements (including the dual coil arrangement) of a measuring system. The apparatus of the co-pending application is a distinct and important improvement over the prior art systems such as those shown and described in U.S. Pat. No. 3,938,384. The prior art system has several distinct disadvantages, as described in the aforementioned application of Abouchar, et al. The Abouchar, et al., application shows and describes an improved system. However, because of the high degree of the sensitivity and tolerance requirements of similar systems, better and improved measuring systems are being sought.

For example, it is desirable to have a method of reducing the effect of the multiple time constants so that the principal time constant becomes dominant. Cancellation of the dominant principal time constant in the electronic control circuitry can then provide a major improvement in speed.

PRIOR ART STATEMENT

The most pertinent prior art known to Applicants is listed herewith.

1. U.S. Pat. No. 3,938,384; MASS FLOW METER WITH REDUCED ATTITUDE SENSITIVITY; R. F. Blair. This patent taught a prior art system with a less than adequate open-cell beaded foam insulator material.

2. U.S. Ser. No. 173,282 (now U.S. Pat. No. 4,440,021, issued Apr. 3, 1984); MASS FLOW METER WITH REDUCED ATTITUDE SENSITIVITY; J. W. Abouchar and M. J. Doyle. This application is directed to a mass flow measuring system with an improved operating capability due to use of a superior insulating material.

3. U.S. Pat. No. 2,813,237; FLOW MEASURING SERVO SYSTEM; D. A. Fluegel, et al. This patent shows another prior art system with less than completely accurate operation.

4. U.S. Pat. No. 4,056,975; MASS FLOW SENSOR SYSTEM; D. B. Le May. This patent shows a device including a sensing tube which includes a loop or single turn helix formed therein.

5. German Patent 876,484; E. Ebbinghaus. This patent shows a temperature sensing bridge network.

SUMMARY OF THE INVENTION

This invention is directed to an improved mass flow measuring system for measuring the flow rate of a fluid in a tube and doing so accurately over wide ranges of attitude and temperature. The improvement comprises using isothermal bands, planes or heat sink encasement to reduce the effect of thermal conduction or convection along the tube of the sensor. In addition, the sensor elements are encased in a thermally insulating environment such as, a vacuum, layers of insulating material, or the like, which is arranged to effectively reduce the thermal flow at the outer surface of the sensor. The device provides improved operation in terms of temperature and attitude sensitivity. In addition, the invention includes a compatible circuit which uses a constant current generator in conjunction with a bridge network to establish a prescribed null signal for the sensing circuit. A precision reference signal is also produced and used by the circuit. A very accurate circuit portion controls both the current generator and the reference signals wherein a highly accurate sensing circuit is produced. Also, the circuit is matched to the operation of the sensor in order to provide extended operational utilization of the system. The number of components in this highly accurate circuit is not significantly different from the ordinary sensing circuit known in the art.

DESCRIPTION OF THE PREFERRED EMBODIMENT

Figure 1:
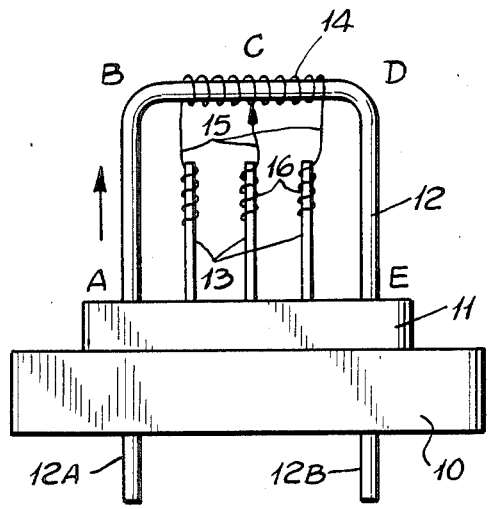
FIG. 1 is an elevation view of a typical configuration of a sensor system in accordance with the instant invention.

Referring now to FIG. 1, there is shown a schematic representation of a sensor system of known configuration. This sensor system is used for measuring the flow of fluid for use in a mass flow measuring system. The system includes a base portion 10 which can be fabricated of phenolic a thermo set or thermoplastic, or any material including metal providing a cost effective mounting technique. In a preferred configuration for use with the instant invention base 10 includes a step portion 11 which is raised slightly above the upper surface of base 10. Both base 10 and step 11 are substantially rectangular in configuration (although this is not a critical requirement of the system.)

The sensor system per se, consists of a thin walled tube 12 which, in this configuration has an inverted U-shaped configuration with a pair of vertical legs connected by a crossmember. The ends 12A and 12B of tube 12 extend from the bottom of base 10 while the U-shaped tube 12 projects from the upper surface thereof. A plurality of electrical connector rods 13 are embedded in step 11 and base 10 to provide electrical connections to sensor coil 14. The coil 14 is wrapped around the cross-member of the U-shaped tube 12. The coil 14 is connected to the connector rods 13 by means of wires 15. The wires 15 represent the end terminals and the center tap of coil 14 (i.e. a dual coil). The wires 15 are wrapped around rods 13 at the junction points 16. Of course, any suitable soldering, brazing, welding or the like can be used in effecting the junction.

As the fluid (gas or liquid) flows through the tube 12, heat is transferred from the tube at heating/sensing element B–C, to the fluid. (That is, it is assumed that the fluid entered the tube at ambient temperature and the sensor portion is different from ambient.) The transfer of heat to the fluid lowers the temperature of the heating/sensing element B–C. A different transfer of heat takes place on element C–D inasmuch as the fluid is no longer at ambient temperature due to it passing through the element B–C. The different heat transfer in B–C and C–D results in a change in electrical bridge balance as described hereinafter. The output voltage produced across the bridge is calibrated to be a measure of mass flow.

Figure 2:
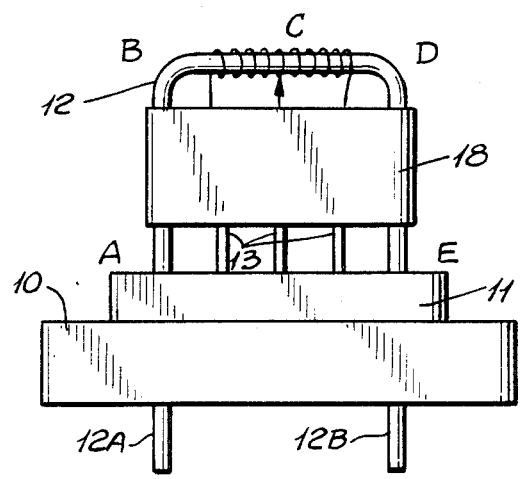
FIG. 2 is an elevation view of the improved sensor system of the invention including one embodiment of an isothermal guard arrangement.

Referring now to FIG. 2, there is shown an improved embodiment of the sensor system. In this instance, a band 18 of a thermally conductive material is wrapped around the sensor tubing unit. The thermally conductive material 18, which may be, for example, an aluminum band or strip, is arranged to contact the vertical legs of tube 12 whereby the entire strap 18 and the contacted portions of tube 12 attain substantially the same temperature. Thus, strap 18 produces an isothermal band around the sensor unit. This isothermal band around the sensor unit tends to provide substantial improvement to the operation of the unit.

Figure 3:
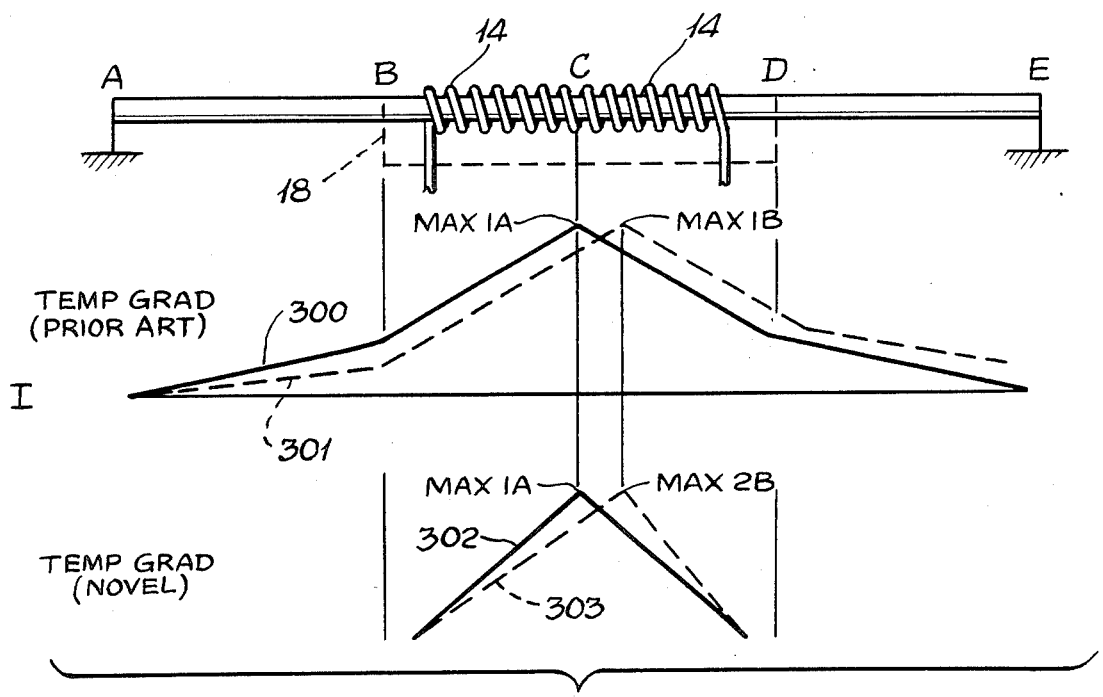
FIG. 3 shows a comparison of the temperature gradients of the sensor systems, shown in FIGS. 1 and 2.

Referring concurrently to FIG. 3, there is shown, graphically, the improved operation which is attainable with the modification to the sensor which is shown in FIG. 2. For convenience, the sensor tube has been shown in a straight configuration in FIG. 3. However, the other aspects thereof remain the same. Thus, the tubing 12, coil 14 and the like remain the same. The reference locations A, B, C, D and E are also considered to be the same. By showing the tubing in a straight line configuration, the operation thereof can be more readily described. Thus, in FIG. 3 the temperature gradient for the prior art sensor unit is shown in line I. In particular, the temperature gradient for the tubing unit without fluid flow therethrough is, essentially, continuously variable along the length of the unit as shown by line 300. The temperature gradient as shown in line I extends from point A to point E in the tubing wherein the temperature gradient increases with distance from A to C and decreases from C to E. That is, heat is applied by the coil portion BC which produces a large gradient in this area. A portion of this heat is transferred along the tube 14 from B toward A so that the gradient extends along the entire length of the tube. Likewise, the temperature gradient varies from C through E because the sensor tube 12 tends to be thermally conductive throughout the entire length thereof.

As shown by the solid line 300, the temperature gradient reaches a maximum value MAX IA as a function of the physical parameters of the system. This gradient (solid line) is observed without gas flow in the sensor tube and is substantially uniformly balanced. Thus, the bridge network associated therewith is balanced or nulled.

When a fluid flows through the tubing, the temperature gradient changes as a function of the temperature transfer from the tubing to the fluid and vice versa. Thus, the temperature gradient for the sensor, with fluid flow therethrough, is as shown by the dashed line 301 in line I of FIG. 3.

That is, as the cooler (i.e. at or near ambient) fluid is passed through the sensor tube, heat is transferred to the fluid from the coil. Thus, the temperature gradient shifts (in this case, to the viewer's right) relative to the sensor unit. The gradient reaches the same maximum value but is shifted as shown by MAX IB.

It is seen that the slopes of the gradients, with and without fluid flow, can be different. Also, it is clear that the gradients are elongated with relatively low slopes. This tends to make the accurate detection thereof more difficult. The known systems have tried many different approaches, especially in terms of convection insulation, to reduce the problem and to improve detection accuracy.

In contrast, the temperature gradient for the unique sensor unit with the isothermal strap is shown in line II of FIG. 3. That is, the isothermal strap 18 (shown schematically in dashed outline) is connected across the sensor unit. In essence, the sensor leg AB and the sensor leg DE (more precisely sensor tube points B and D) are, effectively, joined together and maintained at the same temperature by the application of the isothermal strap. Consequently, there is no thermal gradient in leg AB or in leg DE. Thus, the thermal gradient is limited to the sensor unit span BD. Ideally, this span is limited to the length of tubing covered by coil BC and coil CD. (If point C is a center tap on a single coil, then leg BD is a single unit.)

Thus, with the isothermal strap in place, points B and D are held at equal temperatures. Thus, tubing sections AB and DE do not change temperature irrespective of fluid flow. Consequently, the thermal mass of sections AB and DE of the sensor are removed from the system response characteristics. As a result, the thermal gradient is confined between sensor tube points B and D which is much shorter than the distance between points A and E. The maximum gradient levels are maintained the same, i.e. MAX I=MAX II. The gradient slope is much steeper than in the prior art and is, therefore, more readily and more accurately detected.

As in the prior art, the solid line 302 shows the "no-fluid" balanced condition while the dashed line 303 shows the shifted gradients caused by fluid flow in the tube. The maximum levels MAX IIA and MAX IIB are basically the same as the values of MAX IA and MAX IB in the prior art.

As noted, the principal thermal path of the sensor, with the isothermal bar or strap in place, is the tubing wall of sections BC and CD. With this arrangement, a greater heater power is required to raise the temperature of point C to the same (i.e. MAX II) level above the ambient temperature relative to the sensor as in the prior art (i.e. MAX I). However, the output of the sensor increases because there is no preheating of the gas stream through section AB. More power is required to overcome the thermal conduction of the tubing wall of sections BC and CD. That is, the temperature variations in the novel invention occur only along section BD whereas in the prior art sensors the changes occur along the entire length of the sensor (i.e., from point A through point E).

However, as noted in the cited patents and application, there are other problems which are found with the prior art systems. For example, thermal convection and thermal conduction (secondary losses) along and through the system create problems and diminish accuracy. Many approaches have been tried to avoid these difficulties. In addition, it is noted that the dissimilar metals at junctions 16 tend to cause a thermocouple effect, i.e. generate an EMF between the two dissimilar metals, especially when elevated temperatures are applied thereto. What is more, if these temperatures are different, the different thermocouple effects are such as to cause unpredictable readings at the bridge network.

Figure 4:
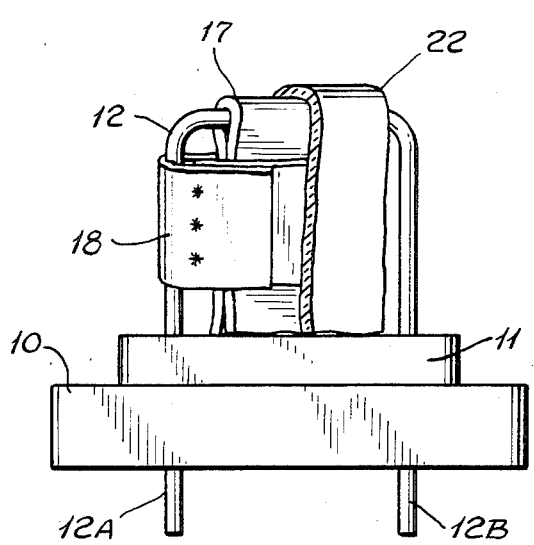
FIG. 4 is an elevation view of the sensor system partially broken away with insulator materials applied thereto.

Referring now to FIG. 4, a sensor unit similar to the sensor unit of FIG. 2 is shown. Similar components bear similar reference numerals. However, in the device shown in FIG. 4, a layer 17 of fibrous insulating material, for example of the type taught in the copending application of Abouchar et al, is disposed over the sensor unit including tube 12, coil 14 and the connector rods 13. Insulating layer 17 can be disposed within isothermal band 18. Typically, insulating layer 17 is fabricated of an insulating material with a high K factor. This insulating layer 17 tends to reduce the thermal convection currents along the sensor apparatus. Thus, the junctions 16 (see FIG. 1) are maintained at a relatively constant temperature and little or no convection current passes along the tube 12, irrespective of the attitude of the sensor unit. This technique is an important extension of the teachings in the copending application. That is, reducing the impact of the thermocouple effects is significant.

As shown in FIG. 4, a further layer 22 of fibrous insulating material can then be disposed over the entire sensing unit, including the isothermal band 18. Insulating layer 22 is shown broken away in FIG. 4 so that the internal arrangements of the components can be better illustrated.

Figure 5:
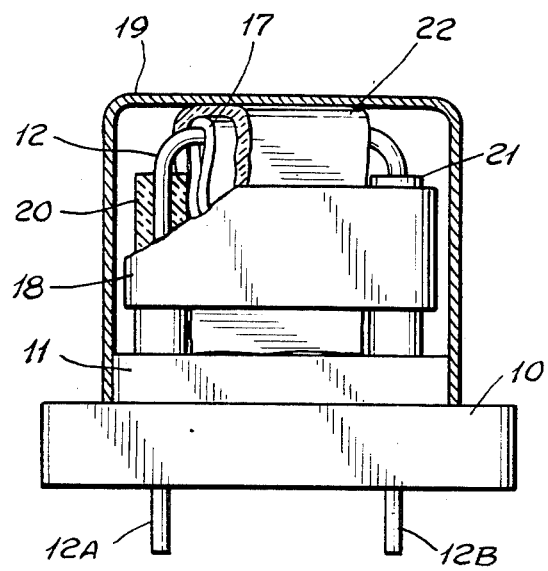
FIG. 5 is an elevation view of the improved sensor system, including another embodiment of an isothermal guard arrangement.

Referring now to FIG. 5, there is shown yet another embodiment of the sensor system of the instant invention. In this case, the fibrous insulator bat 17 is applied as shown in FIGS. 4 and 5. In the embodiment of FIG. 5, relatively large masses 20 and 21 of thermally conductive material are placed around the vertical legs of sensor tube 14. These masses can be thermally tied together with straps 18 of high thermal conductivity material.

The purpose of the large masses 20 and 21 is to effectively reduce any thermal gradient which may exist between the cross-member portion of the U-shaped tube 12 and the ends 12A and 12B. This has a similar effect to the strap 18 in FIG. 2. That is, the masses 20 and 21 produce an isothermal effect between points B and D of the sensor tube.

Still referring to FIG. 5, there is shown outer casing 19 which is used to encase the entire sensor unit, including the various isothermal guard units and the insulating units, as well. The casing 19 also is adapted to snugly embrace step 11 to produce a friction fit therewith. Of course, suitable fastening means between case 19 and step 11 can be provided in any fashion desired. In addition, casing 19 can be fabricated of metal or wrapped in metal foil to produce another isothermal shield.

Figure 6:
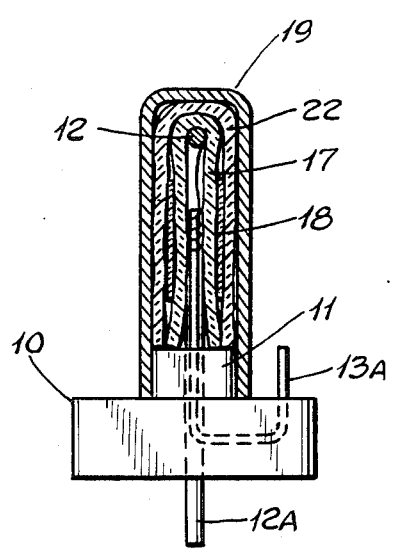
FIG. 6 is a cut-away end view of the sensor system of the instant invention showing the configuration of the various elements.

Referring now to FIG. 6 there is shown a cut-away view of the sensor system taken from one end thereof. In the illustration of FIG. 6, the relative dimensions of base 10 and step 11 are shown. The tube 12 and one end 12A thereof are also shown, together with a dashed outline of the interconnection therebetween. The connector rods 13, per se, are not visible in the embodiment shown in FIG. 6. However, an end thereof is shown in one typical implementation wherein the end 13A is brought out of block 10 for connection with other portions of the sensor unit such as, but not limited to, the bridge sensing network described herein.

Figure 7:
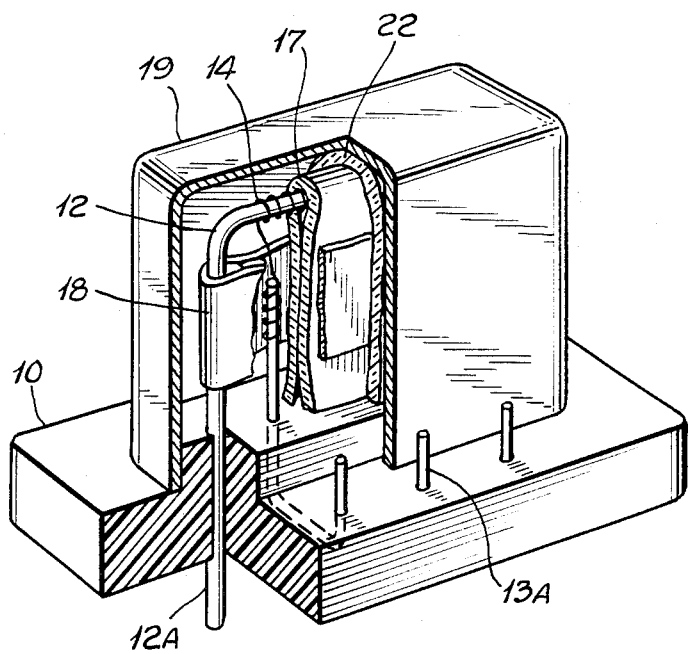
FIG. 7 is a partially broken away perspective view of the sensor system of the instant invention with an outer casing.

It is clear from the showing of FIG. 7 that the first insulating layer 17 is draped over the sensor tube 12 (and coil 14) and positioned adjacent thereto. In the embodiment shown in FIG. 7, the thermally conductive strap 18 is disposed against the sides of insulator layer 17. Typically, guard band 18 is used to "pinch-in" the sides of insulator 17 to closely engage connecting rods 13 thereby to avoid any thermal convection thereat. The outer insulator layer 22 is then placed over the inner insulator 17 and the associated isothermal guard apparatus as well. The casing 19 is then disposed over the entire assembly to maintain the insulators in close proximity to the sensor apparatus.

It should be understood that the cut-away view shown in FIG. 6 can also represent a cut-away view of the system shown in FIG. 5. In this case, the element 18 would represent the opposite halves of an element 20 or 21 when viewed from the end of the apparatus. In either case, the construction would be substantially similar.

As noted above, a bridge circuit is typically used to permit a highly accurate signal to be achieved though the balancing of representative signals in the overall operation. However, many of the existing circuits suffer from problems of, for example, offset voltages which are generated in the various portions thereof. These offset voltages produce inaccuracies and/or tolerance problems with the circuit operation. In the past, attempts to reduce this offset voltage problem have produced other problems such as lack of stability, unnecessary rolloff or the like. As a consequence, the improved circuit of this invention is highly desirable.

Figure 8:
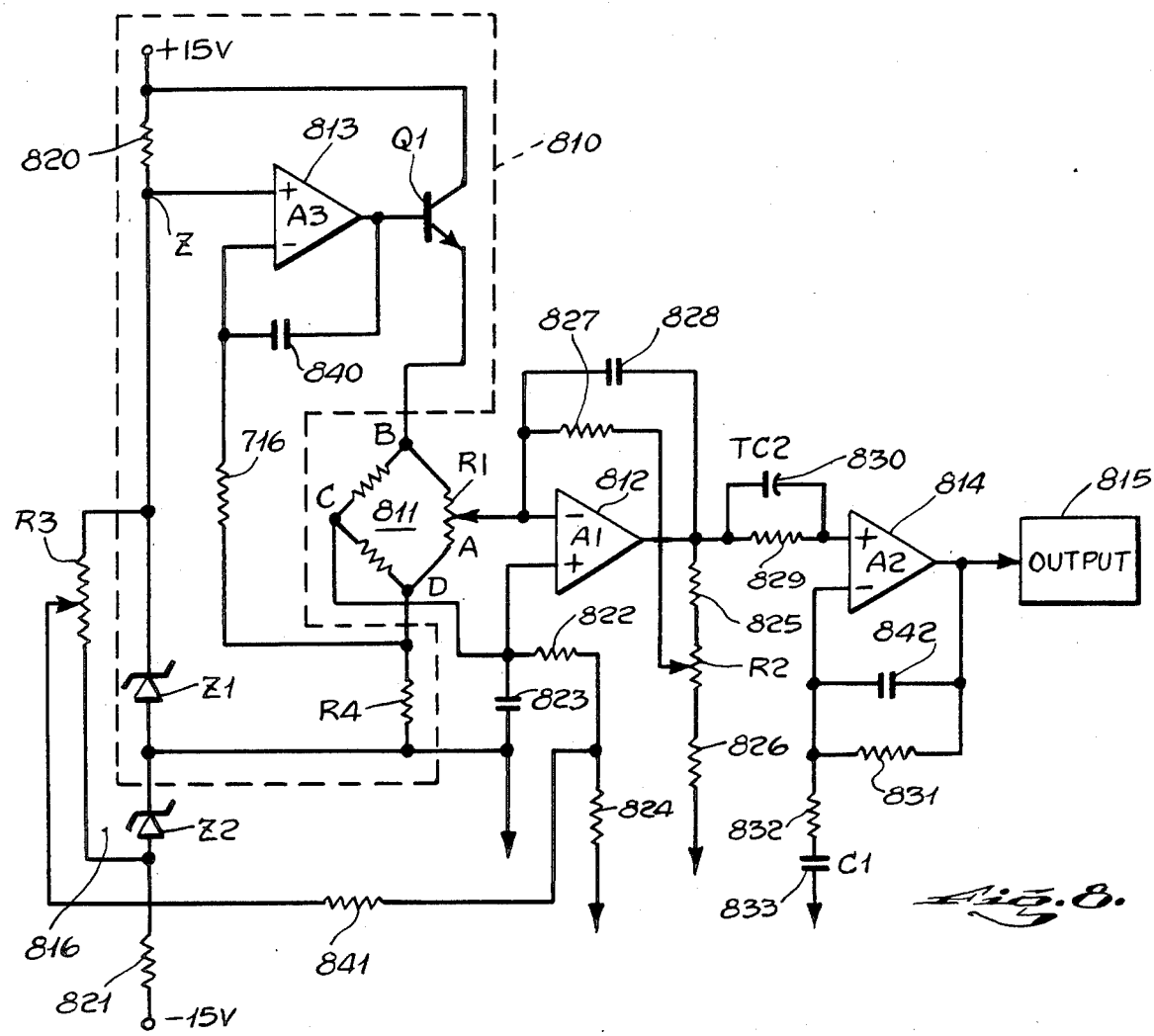
FIG. 8 is a schematic diagram of a preferred embodiment of the circuit of the instant invention.

Referring now to FIG. 8, there is shown a schematic diagram of the circuit of the instant invention. The major areas of the circuit are a constant current generator 810 which includes an operational amplifier 813 which is connected to a bridge circuit 811. A precision signal circuit portion 816 is also connected to the current generator 810 and to the bridge 811. At node D there is produced a voltage which indicates in a precision manner, the current through the bridge 811. Differential amplifier 812 is connected to the bridge circuit 811. An operational amplifier 814 is connected to the output of amplifier 812 and an output or utilization device 815 is connected to the output of amplifier 814.

In more detail, the bridge circuit 811 is typically, constructed in any fashion known in the art. In this application of the circuit, leg B, C, D of bridge 811 is formed of coil 14 shown in FIGS. 1–7. A variable resistor R1 forms one side of the bridge so that the wiper arm or tap of the variable resistor effectively forms one node (A) of the bridge 811. This node is connected to the minus (−) input terminal of differential amplifier A1 of typical design (e.g. Fairchild UA 741 CP or Texas Instruments TL075CN).

The plus (+) input terminal of amplifier 812 is connected to the opposite node (node C) of bridge network 811 so that the input signal supplied to the amplifier 812 is, effectively, determined by the operation of the bridge as is well known in the art. One of the intermediate nodes (node B) of bridge 811 is connected to the emitter electrode of NPN transistor Q1. The collector electrode of transistor Q1 is connected to a suitable voltage source, in this instance +15 volts. The base electrode of transistor Q1 is connected to the output terminal of operational amplifier 813 (which is designated as amplifier A3) and is similar in structure to amplifier A1.

The voltage source generated at the cathode of Z1 (1.24V), is connected to the plus (+) or non-inverting terminal of operational amplifier 813. The cathode of Zener diode Z1 is also connected to one end of resistor 820 and to one terminal of variable resistor R3. The other end of resistor 820 is connected to a suitable power source. The anode of Zener diode Z1 is connected to ground. The other terminal of variable resistor R3 is connected, via resistor 821 to another voltage source, and to the anode of Zener diode Z2 which has the cathode thereof connected to ground. This circuit arrangement produces a precise voltage (−1.24 volts)

at the anode of diode Z2. In addition, the anode of Zener diode Z1 is connected to ground. Resistor R4 is connected between ground and the second intermediate node (node D) of bridge circuit 811. Node D is also connected to the minus (−) or non-inverting input terminal of amplifier 813 via resistor 816. Filter capacitor 840 is connected across amplifier 81. It is seen that most of the components described above, with the exception of bridge 81 form a constant current generator which supplies a constant current to the bridge network.

The plus (+) input terminal of amplifier 812 is connected to ground via resistors 822 and 824 as well as roll-off capacitor 823. The common junction of resistors 822 and 824 is also connected via resistor 841 to the tap or wiper arm of resistor R3. It will be seen that this network comprises a biasing resistor, as well as a roll-off controlling network, which BIAS is capable of being precisely modified via resistor R3.

The output terminal of amplifier 812 is connected to a resistor network comprising fixed resistors 825 and 826 and a variable resistor R2. This series resistor network is further connected to ground with variable resistor R2 connected between resistors 825 and 826. The tap of resistor R2 is connected to the gain control feedback network which comprises resistor 827. Rolloff capacitor 828 is connected in parallel with amplifier 812. In particular, this gain and time constant control network is returned to the minus (−) input terminal of amplifier 812.

The output terminal of amplifier 812 is connected to the plus (+) input terminal of amplifier 814 via the RC network comprising resistor 829 and capacitor 830. The resistor and capacitor are connected in parallel to provide a stability and noise eliminating input circuit to amplifier 814. The output terminal of amplifier 814 is returned to the minus (−) input terminal of amplifier 814 via the feedback network comprising resistor 831 and capacitor 842. The minus (−) terminal is also connected to ground via the series connected RC network comprising resistor 832 and capacitor 833. This series RC network R31, R32 and R33 around amplifier 813 produces a signal phase cancellation as will be described hereinafter. In addition, the output of amplifier 814 is connected to a suitable output or utilization device 815 which can comprise a meter, a control circuit or the like.

In operation, the circuit is arranged as shown. As noted, the bridge 811 represents the sensing element in the sensor apparatus. The Zener diodes Z1 and Z2 are arranged to produce substantially constant voltage drops thereacross. Consequently, the voltage level at the cathode of Zener diode Z1 is +1.24 volts while the voltage at the anode of Zener diode Z2 is −1.24 volts. These voltages are achieved in accordance with the voltage source and the current limiting resistor 820 and 821, respectively.

Thus, the voltage developed across variable resistor R3 is between −1.24 volts and +1.24 volts. The voltage developed across the resistor R3 is then divided and a portion thereof is obtained at the variable tap and supplied to the non-inverting (+) input of amplifier 812. The signal from resistor R1 is supplied to the inverting (−) input terminal of amplifier A1. By adjusting resistor R1, accurate control can be obtained to adjust the offset voltage of the bridge as well as the common mode characteristics of the system. By adjusting resistor R3, a precise adjustment for the zeroing of the offset voltage to amplifier 812 is achieved. While other known circuits use offset nulling and adjusting circuits, the arrangement shown in FIG. 8 provides an extremely precise and accurate offset voltage nulling operation while maintaining the common mode characteristics of the system in check.

It should be understood that the connection of resistor R4 between the bridge and signal ground is also highly advantageous. In known circuits of the sensor type, this resistor is usually returned to the plus (+) voltage supply. However, in the inventive circuit design, the voltages for resistor R3 are readily available in a convenient manner.

In addition, the constant current generator circuitry 810 is much simpler to implement. The current generator 810 operates to control the current flowing through bridge network 811. That is, when transistor Q1 is turned on, the current therethrough flows through bridge 811 and resistor R4 to ground. The voltage at node D is returned to the inverting input of amplifier 813. The non-inverting input of amplifier 813 is tied to the fixed voltage at terminal Z (which is also the cathode of Zener diode Z1). The amplifier 813 output drives transistor Q1 to produce a null at the amplifier inputs. This occurs when the voltage across R4 is equal to the voltage across diode Z1. Since the voltage across R4 is held constant, the current therethrough is also constant. The resistance of the bridge, however, can vary with temperature. Therefore, the voltage at the emitter electrode of transistor Q1 will vary as the bridge resistance varies, thereby keeping the current constant through the sensor bridge 811.

Resistor R2 (connected at the output of amplifier 812) is used to adjust the gain of the bridge amplifier 812. By using this arrangement, a further control characteristic of the circuit is provided. That is, the gain of amplifier 812 is adjustable and, if desirable, permanently settable by fixing resistor R2 once the proper gain adjustment is made.

Figure 9A:
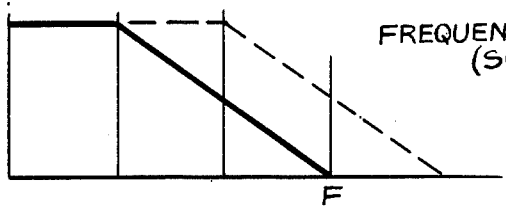
FIGS. 9A, 9B and 9C are graphic representations of the operation of the sensor system of the instant invention.
Figure 9B:
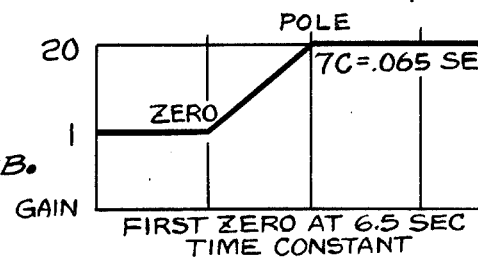
Figure 9C:
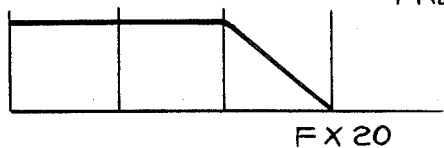

As noted above, the time constant circuit comprising resistor 829 and capacitor 830 are used to provide equal impedance to the input terminals of amplifier A2. The circuit comprising resistor 831 and capacitor 833 has a time constant equal and opposite to the principal time constant of the sensor device. In one embodiment resistor 831 is 6.5 megohms and capacitor 833 is 1 MFD. (This produces an RC time constant of 6.5 seconds.) This RC time constant was selected because the frequency response of the sensor establishes a principal pole at 6.5 seconds (see FIG. 9A). The combination of resistor 831, capacitor 833 and amplifier 814 produces a frequency response with a 6.5 second zero thereby balancing the sensor pole (see FIG. 9B). Resistor 832 limits the effect of resistor 831 and capacitor 833 to a useful operating range and reduces high frequency noise. When the frequency response characteristics of the sensor (FIG. 9A) are combined with the frequency response characteristics of the circuit (FIG. 9B), the combined system operating characteristic is shown in FIG. 9C. That is, the response characteristic of the sensor is substantially compensated by the response characteristic of the circuit. Consequently, the compensated system characteristic is substantially flat for at least 5 time constants. At this point rolloff in operating characteristic is unimportant because the system is in equilibrium. In this instance, the relatively simple compensation electronic circuit shown in FIG. 8 is satisfactory. That is, the RC circuit comprising resistor 831 and capacitor 833 is sufficient to compensate for the time constant of the sensor. It must be noted that in conjunction with many prior art sensor devices, an extremely complex time constant relationship is produced. In those cases, only a small correction of the time constant is possible without an extraordinarily complex and expensive compensation network.

In the new circuit, a dramatic improvement in performance of the sensor apparatus is achieved. That is, the speed of the sensor operation is improved by approximately 2:1 but the ability to cancel the time constant is improved by approximately 10:1.

Figure 10A:
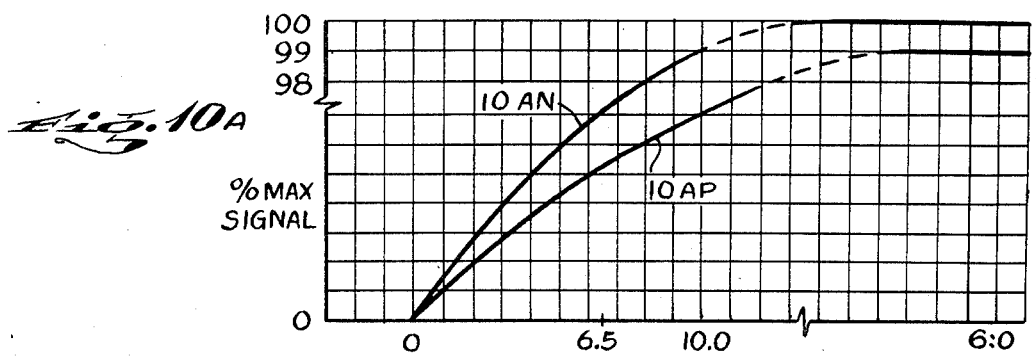
FIGS. 10A and 10B are graphic representations of the improved sensor system compared with the prior art system operation.
Figure 10B:
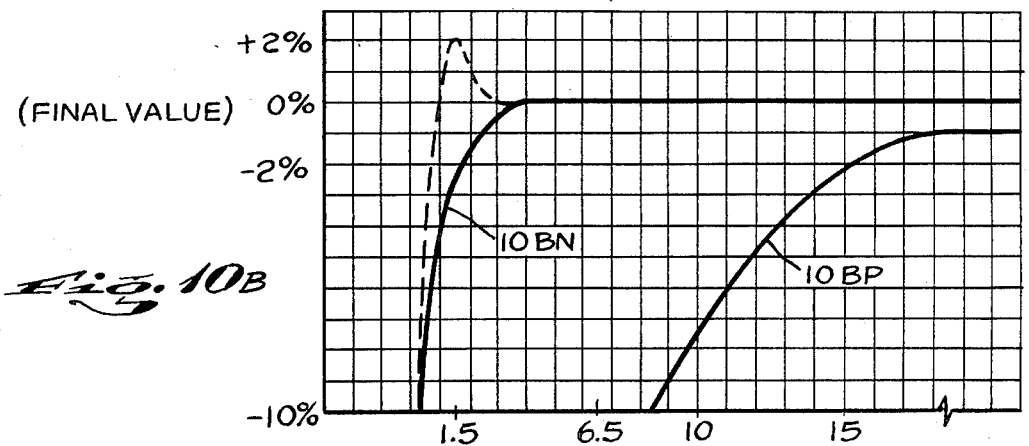

The improvement in the sensor apparatus operation is suggested in FIGS. 10A and 10B. In particular, in FIG. 10, there is shown a graphic comparison of the system operation as related to the prior art system. In particular, it is seen that the prior art system represented by curve 10AP, has a first time constant (i.e. it reaches about 63% of maximum) in about 10 seconds. Furthermore, this system reaches about 1% from maximum in about one minute after operation is begun. By adding the improvement of the isothermal bands to the sensor device, the curve 10AN is produced. It is seen that with this modification the system reaches its first time constant within 6.5 seconds. Moreover, the system is within 1% of maximum at ultimate (or maximum) signal about 10 seconds. By one minute after start up, the new system is within 0.1% of maximum operation. Thus, the improvements over the prior art system are clear.

Referring now to FIG. 10B, there are shown waveforms for the operation of circuits and systems of the prior art and the inventions described herein. In this instance, the ideal situation is such that the signal switches instantaneously from the zero level to the final value. Thus, a perfect step wave is produced. However, in reality this is rarely achieved. The waveforms depicted herein represent a typical circuit operation by the prior art devices and the instant invention within about 10% of maximum final value. In this case, it is seen that the signal 10BP tends to have an undershoot or overshoot of approximately ±10%. The circuit then responds and compensates for this to error. In the waveform shown, the circuit does not settle down to the ideal condition for over a minute (see FIG. 10A). It is obvious that the circuit could continue to "hunt" or "ring" as is known in many devices. However, some known devices are able to settle down to an operating condition within ±2% error within approximately 15 seconds after the signal change that was initiated.

However, the operation of the circuit of the instant invention is shown by waveform 10BN. In this instance, the overshoot is limited to two percent (or less) and is generally limited to approximately 1%. In this inventive system, the overshoot and hunting to achieve the optimum condition are virtually eliminated. That is, the inventive system tends to reach the optimum level within approximately 1.5 seconds (or less). This rapid operation is achievable because the sensor device is much more easily controlled and produces a relatively simple operating characteristic. The circuit compensation is, therefore, much simpler as well.

In comparisons of the existing devices and the device covered hereby, it is observed that the prior art devices have errors in the order of seven percent or more and take approximately 6–15 seconds (or more) to settle to an operating condition of ±2% error. Conversely, the circuit and system of the instant invention has a maximum error of two percent or less and tends to settle to the optimum operating condition within 1.5 seconds.

Inasmuch as the circuit is frequently used to control a mass flow meter of the type described in the copending application, this rapid response time is highly desirable. That is, the sensor device frequently controls critical measurements or processes such as, but not limited to, semiconductor fabrication techniques. Clearly, these controls are of great significance in order to produce useful devices.

Figure 11:
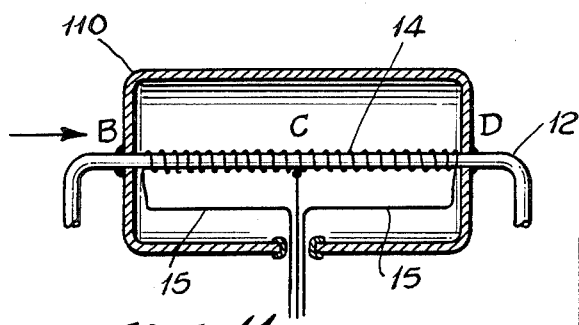
FIG. 11 is a schematic representation of another embodiment of an isothermal guard arrangement.

Referring now to FIG. 11, there is shown an improved embodiment of the sensor. In this instance, a heat sink encasement 110 is bonded to the sensor tubing 12 at points B and D in such a manner that good thermal contact is made between the tubing and the walls of the encasement. In this instance the walls of the encasement act as a good thermal conductor to maintain the sensor tubing between points B and D at an even temperature and to prevent heat from being dissipated in the vertical legs of the sensor tubing thereby degrading the accuracy of the sensor coil 14 readings. Additionally, an even temperature gradient between points B and D is maintained regardless of sensor attitude. Copper coating the sensor tubing 12 between points B and D helps to insure good heat conductivity. In this way, outside conditions normally affecting the accuracy of the sensor readings are virtually eliminated. In the preferred embodiment, the points B and D are immediately adjacent to the ends of the winding 14 in order to minimize the thermal gradient.

Normal radiation due to convection is eliminated by operating the sensor coils in a vacuum, i.e. by evacuating the chamber defined by encasement 110. Thus, the heat sink encasement 110 acts both as an isothermal device to maintain an even temperature differential across the critical area of measurement, i.e. coil 14, and a heat sink to protect the sensor reading from being impacted by abnormal radiation in the vertical legs of the tubing due to attitude changes. Similar results can be attained by replacing the vacuum within the heat sink encasement 110 with a high k-factor type of insulation.

Figure 12:
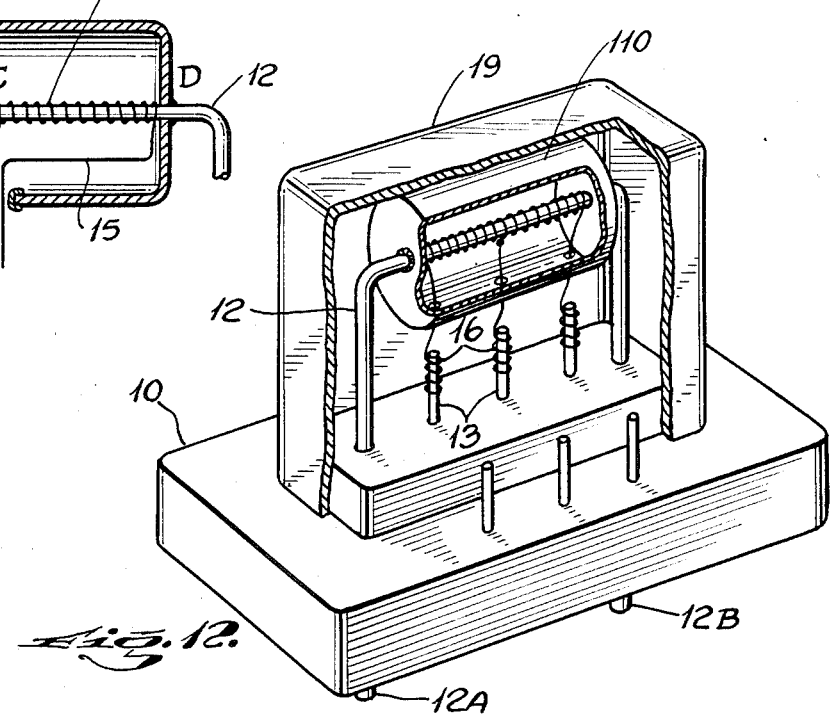
FIG. 12 is a partially broken away perspective view of the embodiment shown in FIG. 11 in greater detail.

Referring to FIG. 12, there is shown a partially broken away perspective view of an embodiment of the sensor of the instant invention including the encasement 110. In this embodiment, the encasement 110 is made of a thermally conductive material which is connected to the tube 12 immediately adjacent to the ends of coil 14. Inasmuch as encasement 110 is evacuated, thermal convection does not occur relative to coil 14. Therefore, the insulation layers shown in the other embodiments can be eliminated. Moreover, the isothermal strap 18 is, effectively, replaced by encasement 110, Of course, a high k insulation material (not shown) can be used within the encasement 110, as well, if so desired.

Thus, there is shown and described a new, unique and improved construction for a mass flow measuring system. The system of the instant invention provides a means for closely controlling the area of temperature transfer and temperature gradients relative to the sensor. In particular, an isothermal plane is created adjacent to the sensor coil. By controlling the temperature transfers, the operation of the sensor system can be greatly improved. Greater accuracy can be achieved through reduction of temperature gradients and thermal shifts. In addition, a faster operating circuit can be used with the sensing coil if so desired, in order to produce substantially improved system operation. The circuit can be more accurately matched to the operating characteristics of the sensor, per se. This permits faster overall operation of the sensor system. While the invention has been shown and described in detail with great specificity, this teaching is intended to be illustrative only, and is not intended to be limitative. The scope of the invention is limited only by the claims appended hereto.

Having thus described a preferred embodiment, what is claimed is:

1. A fluid mass flow meter comprising:
    a tube having therethrough a flow path for the fluid;
    a sensor disposed adjacent the tube, in thermal connection therewith, and along said fluid flow path, the sensor having distal and proximal extremities, the sensor having a first electrical terminal at its distal extremity, a second electrical terminal at its proximal extremity, and a third electrical terminal at an intermediate point between the first and second terminals, the first and third terminals defining a first sensor unit, the second and third terminals defining a second sensor unit, each of said units operative, in response to a change in the temperature thereof, to change the electrical resistance therethrough;
    thermally conductive means in thermal communication with the tube at a first point adjacent said distal extremity and at a second point adjacent said proximal extremity, operative to prevent said first point from having a different temperature than said second point;
    resistance means having a first connection at a distal extremity thereof, a second connection at a proximal extremity thereof, and a third connection at an intermediate point between the first and second connections, said first and second connections being in electrical communication with the first and second terminals of the sensor, respectively, the resistance means and the sensor in combination defining a bridge;
    a current source, operative to cause a current to flow through the bridge;
    differential amplifier means having a first input in electrical communication with the third sensor terminal, a second input in electrical communication with the third resistance connection, and an output;
    frequency compensating amplifier means in electrical communication with the differential amplifier means and having a final output and operative to produce at the final output a signal indicative of the rate of flow of the fluid through the tube;
    a feedback element in a negative feedback relationship with the final output of the frequency compensating amplifier and a feedback input thereof; and
    frequency compensation means, in electrical communication with the frequency compensating amplifier means and operative to alter the gain thereof as a predetermined function of the rate of change of the signal being amplified, said function being a positive function over a part of its range.

2. A fluid mass flow meter according to claim 1 wherein the frequency compensation means comprises a capacitor.

3. A fluid mass flow meter according to claim 2 wherein the frequency compensation means comprises a resistor in electrical communication with the capacitor.

4. A fluid mass flow meter according to claim 3 wherein the capacitor is in electrical communication with the feedback input and with a ground reference, and wherein the resistor is in a negative feedback relationship with the frequency compensating amplifier.

5. A fluid mass flow meter according to claim 4 and further comprising a second resistor in series relationship with the capacitor.

6. A fluid mass flow meter according to claim 4 wherein the feedback element comprises a capacitor.

7. A fluid mass flow meter comprising:
 a tube having therethrough a flow path for the fluid;
 a sensor disposed adjacent the tube, in thermal connection therewith, and along said fluid flow path, the sensor having distal and proximal extremities, the sensor having a first electrical terminal at its distal extremity, a second electrical terminal at its proximal extremity, and a third electrical terminal at an intermediate point between the first and second terminals, the first and third terminals defining a first sensor unit, the second and third terminals defining a second sensor unit, each of said units operative, in response to a change in the temperature thereof, to change the electrical resistance therethrough;
 thermally conductive means in thermal communication with the tube at a first point adjacent said distal extremity and at a second point adjacent said proximal extremity, operative to prevent said first point from having a different temperature than said second point;
 resistance means having a first connection at a distal extremity thereof, a second connection at a proximal extremity thereof, and a third connection at an intermediate point between the first and second connections, said first and second connections being in electrical communication with the first and second terminals of the sensor, respectively, the resistance means and the sensor in combination defining a bridge;
 a current source, operative to cause a current to flow through the bridge;
 a differential amplifier having a first input in electrical communication with the third sensor terminal, a second input in electrical communication with the third resistance connection, and a differential output;
 an operational amplifier having an inverting input, a non-inverting input in electrical communication with the differential output, and a final output, said operational amplifier being operative to produce at said final output a signal indicative of the rate of flow of the fluid through the tube;
 a feedback element in electrical communication between the final output and the inverting input; and
 frequency compensation means including a resistor and a capacitor in electrical communication with the operational amplifier and operative to alter the gain thereof as a predetermined function of the rate of change of the signal being amplified, said function being a positive function over a part of its range.

8. A fluid mass flow meter according to claim 7, wherein the frequency compensation means is characterized by a time constant of about 6.5 seconds.

9. A fluid mass flow meter according to claim 7, wherein the frequency compensation means is characterized by a time constant that is about equal to the time required for the resistance of one of the sensor elements to achieve about 63 per cent of the change of resistance that it will ultimately achieve in response to a change in the rate of flow of the fluid.

10. A fluid mass flow meter according to claim 7 wherein the capacitor is in electrical communication with the inverting input and with a ground reference, and wherein the resistor is in electrical communication with the inverting input and with the final output.

11. A fluid mass flow meter according to claim 10 and further comprising a second resistor in series relationship with the capacitor.

12. A fluid mass flow meter according to claim 10 wherein the feedback element comprises a capacitor.

13. A fluid mass flow meter comprising:
 a tube having therethrough a flow path for the fluid;
 a sensor disposed adjacent the tube, in thermal connection therewith, and along said fluid flow path, the sensor having distal and proximal extremities, the sensor having a first electrical terminal at its distal extremity, a second electrical terminal at its proximal extremity, and a third electrical terminal at an intermediate point between the first and second terminals, the first and third terminals defining a first sensor unit, the second and third terminals defining a second sensor unit, each of said units operative, in response to a change in the temperature thereof, to change the electrical resistance therethrough;
 thermally conductive means in thermal communication with the tube at a first point adjacent said distal extremity and at a second point adjacent said proximal extremity, operative to prevent said first point from having a different temperature than said second point;
 a potentiometer having first and second connections at opposing extremities of a fixed resistance element and a third connection at a variable intermediate point along said element, said first and second connections being in electrical communication with the first and second terminals of the sensor, respectively, the potentiometer and the sensor in combination defining a bridge;
 a current source, operative to cause a current to flow through the bridge;
 differential amplifier means having a first input in electrical communication with the third sensor terminal, a second input in electrical communication with the third potentiometer connection, and an output;
 adjustable bias means for applying an offset null bias to one of the inputs of the differential amplifier;
 frequency compensating amplifier means in electrical communication with the differential amplifier means and having a final output and operative to produce at the final output a signal indicative of the flow of the fluid through the tube;
 a feedback element in a negative feedback relationship with the final output of the frequency compensating amplifier and a feedback input thereof; and
 frequency compensation means, in electrical communication with the frequency compensating amplifier means and operative to alter the gain thereof as a predetermined function of the rate of change of the signal being amplified, said function being a positive function over a part of its range.

14. A fluid mass flow meter according to claim 13 wherein the frequency compensation means comprises a capacitor.

15. A fluid mass flow meter according to claim 14 wherein the frequency compensation means comprises a resistor in electrical communication with the capacitor.

16. A fluid mass flow meter according to claim 15 wherein the capacitor is in electrical communication with the feedback input and with a ground reference, and wherein the resistor is in a negative feedback relationship with the frequency compensating amplifier.

17. A fluid mass flow meter according to claim 16 and further comprising a second resistor in series relationship with the capacitor.

18. A fluid mass flow meter according to claim 16 wherein the feedback element comprises a capacitor.

19. In a fluid mass flow meter of the kind having:

a tube having therethrough a flow path for the fluid;

a sensor disposed adjacent the tube, in thermal connection therewith, and along said fluid flow path, the sensor having distal and proximal extremities, the sensor having a first electrical terminal at its distal extremity, a second electrical terminal at its proximal extremity, and a third electrical terminal at an intermediate point between the first and second terminals, the first and third terminals defining a first sensor unit, the second and third terminals defining a second sensor unit, each of said units operative, in response to a change in the temperature thereof, to change the electrical resistance therethrough;

a bridge element having three electrical terminals, the first and second terminals being connected to the first and second terminals, respectively, of the sensor to define therewith a bridge;

a current source, operative to cause a current to flow through the bridge; and differential amplifier means having a first input in electrical communication with the third terminal of the sensor, a second input in electrical communication with the third terminal of the circuit element, and an output, an improvement comprising:

a potentiometer comprised in the bridge element;

adjustable bias means for applying an offset null bias to one of the inputs of the differential amplifier means;

thermally conductive means in thermal communication with the tube at a first point adjacent said distal extremity and at a second point adjacent said proximal extremity, operative to prevent said first point from having a different temperature than said second point;

frequency compensating amplifier means in electrical communication with the differential amplifier means and having a final output and operative to produce at the final output a signal indicative of the flow of the fluid through the tube;

a feedback element in a negative feedback relationship with the final output of the frequency compensating amplifier and a feedback input thereof; and frequency compensation means, in electrical communication with the frequency compensating amplifier means and operative to alter the gain thereof as a predetermined function of the rate of change of the signal being amplified, said function being a positive function over a part of its range.

20. A fluid mass flow meter according to claim 19 wherein the frequency compensation means comprises a capacitor.

21. A fluid mass flow meter according to claim 20 wherein the frequency compensation means comprises a resistor in electrical communication with the capacitor.

22. A fluid mass flow meter according to claim 21 wherein the capacitor is in electrical communication with the feedback input and with a groud reference, and wherein the resistor is in a negative feedback relationship with the frequency compensating amplifier.

23. A fluid mass flow meter according to claim 22 and further comprising a second resistor in series relationship with the capacitor.

24. A fluid mass flow meter according to claim 22 wherein the feedback element comprises a capacitor.

* * * * *